Figures 1, 2:
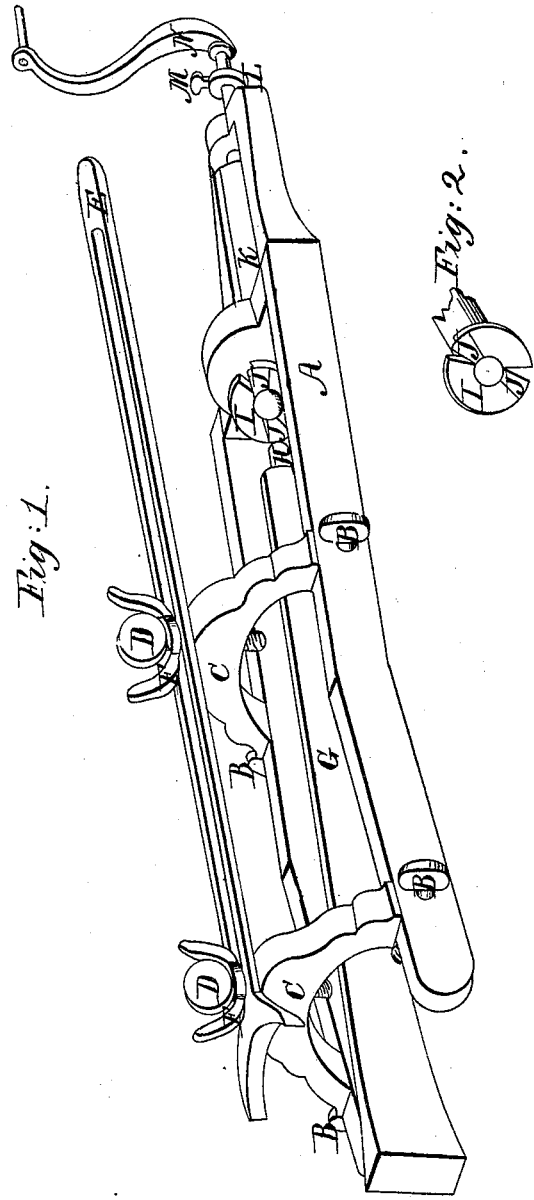

M. Gunn.
Tenoning Spokes.

No. 96,800. Patented Nov. 16, 1869.

Witnesses;
E. F. Huyck
J. Ernest Galvan

Inventor;
Milburn Gunn

United States Patent Office.

MILBURN GUNN, OF JEFFERSONTOWN, KENTUCKY.

Letters Patent No. 96,800, dated November 16, 1869.

IMPROVEMENT IN MACHINE FOR TENONING SPOKES.

The Schedule referred to in these Letters Patent and making part of the same

*To all whom it may concern:*

Be it known that I, MILBURN GUNN, of Jeffersontown, Jefferson county, and State of Kentucky, have invented a new and useful Improvement in Machines for Cutting the Tenons on the Spokes of Wagon-Wheels and other similar purposes; and I do hereby declare that the following is a full, clear, and exact description thereof, reference being had to the accompanying drawing, and to the letters of reference marked thereon.

The nature of my invention consists in providing a small iron frame, in one end of which is arranged a spindle, for the purpose of operating the cutter, which is done by a crank on the end, while the other end is made forked, with one of the prongs on either side running parallel with the spoke, and having sufficient space between to admit the spokes being adjusted between them, which is done by two set-screws in either side; and in order to prevent the parts from pressing apart, there are two arch-braces across the upper side, into which set-screws are inserted for the purpose of adjusting the spoke in that direction, and also to act as set-screws, on which a gauge is made to slide, for the purpose of gauging the length of the spokes, and when set is held in its place by thumb-nuts on the screws.

To enable others skilled in the art to make and use my invention, I will proceed to describe its construction and operation, by reference to the drawings, and to the letters of reference marked thereon.

Figure 1 is a perspective view of the machine.

A is the frame.

B B B B are the set-screws by which the spoke is adjusted.

C C are the arch-braces, which prevent the frame from pressing apart.

D D are the set-screws in the same.

E is the sliding gauge, for adjusting the length of the spokes.

F F are the thumb-nuts, by which it is held when set.

G is the spoke when in position to be operated on.

H is the tenon when cut.

I is the cutter-head.

J J are the cutters on the same.

K is the spindle, by which the cutters are operated.

L is a loose collar, with set-screw, for the purpose of setting the cutter-spindle at any desired point, so as to adjust the length of the tenon.

M is the set-screw by which the collar L is held when set.

N is the crank and handle by which the cutter-spindle is operated.

Figure 2 is a perspective view of the cutter-head.

*i* is the head.

J J are the cutters.

O is the hole into which the tenon passes as it is cut.

The above machine is all made of iron except the cutters, which are made of steel, and is operated by placing the machine over the spoke of the wheel, as shown in fig. 1; after which fasten and adjust it by the set-screws B B B B, in the sides and top for that purpose; after which set the gauge E up against the hub of the wheel, in order to gauge the length of the spokes, and adjust the end in proper position for the cutters to operate. It is only necessary to press the cutters K up against it, and turn the crank N, and it will readily take hold and cut the tenon by operating it in the same manner as a common auger; and in order that the tenon may be cut the proper length, the loose collar L is set in proper position on the spindle K, and acts as a stop against the end of the frame A, causing the cutters to stop at that point. Therefore I do not claim anything as original in the cutter-head I or the cutters J J.

I do not claim as new in themselves either the use of a gauge on a spoke-tenoning machine, an adjustable collar, L, vertical screws D, or cutter I J; but What I do claim as my invention or improvement, and desire to secure by Letters Patent, is—

The described arrangement of the shaft K N, adjustable collar L M, cutter I J, frame A A, with braces C C, gauge E, set-screws B B D D, and thumb-nuts F F, all constructed to operate substantially as herein set forth.

MILBURN GUNN.

Witnesses:
 E. F. HUYCK,
 J. ERNEST GALVAN.